US011012760B2

(12) United States Patent
Kingori

(10) Patent No.: US 11,012,760 B2
(45) Date of Patent: May 18, 2021

(54) SYSTEM AND METHOD FOR BRANCHING-PLOT VIDEO CONTENT AND EDITING THEREOF

(71) Applicant: Wanjeru Kingori, Dallas, TX (US)

(72) Inventor: Wanjeru Kingori, Dallas, TX (US)

( * ) Notice: Subject to any disclaimer, the term of this patent is extended or adjusted under 35 U.S.C. 154(b) by 0 days.

(21) Appl. No.: 16/150,349

(22) Filed: Oct. 3, 2018

(65) Prior Publication Data

US 2020/0112772 A1    Apr. 9, 2020

(51) Int. Cl.
*H04N 21/8541* (2011.01)
*H04N 21/845* (2011.01)
*H04N 21/8545* (2011.01)

(52) U.S. Cl.
CPC ..... *H04N 21/8541* (2013.01); *H04N 21/8456* (2013.01); *H04N 21/8545* (2013.01)

(58) Field of Classification Search
CPC ........... H04N 21/8541; H04N 21/8546; H04N 21/8545; H04N 21/8456
See application file for complete search history.

(56) References Cited

U.S. PATENT DOCUMENTS

| | | | | |
|---|---|---|---|---|
| 6,538,654 | B1* | 3/2003 | Rose | G06T 13/20 345/473 |
| 9,082,092 | B1* | 7/2015 | Henry | G06Q 10/06 |
| 9,418,111 | B1* | 8/2016 | de Moor | G06F 16/244 |
| 9,948,601 | B2 | 4/2018 | Husain | |
| 10,164,941 | B2 | 12/2018 | Husain | |
| 2004/0139481 | A1* | 7/2004 | Atlas | G06F 17/2241 725/135 |
| 2006/0064733 | A1* | 3/2006 | Norton | G11B 19/025 725/135 |
| 2007/0099684 | A1* | 5/2007 | Butterworth | G11B 27/105 463/1 |
| 2010/0306818 | A1* | 12/2010 | Li | G06F 16/88 726/1 |

(Continued)

OTHER PUBLICATIONS

Gyorodi, Cornelia; "Improve Query Performance on Hierarchical Data. Adjacency List Model Vs. Nested Set Model"; Apr. 2016; International Journal of Advanced Computer Science and Applications; vol. 7, No. 4; pp. 3-6 (Year: 2016).*

(Continued)

*Primary Examiner* — Sumaiya A Chowdhury
(74) *Attorney, Agent, or Firm* — David W. Carstens; James D. Tuck; Carstens & Cahoon, LLP

(57) ABSTRACT

A computer-implemented method and system for creating and displaying branching-plot video content. The method comprises obtaining, from a database, a set of nodes and each node comprises an audio element, video element, and a set of node branches, wherein at least on node is a parent and another a child; obtaining a relational table; designating a current node, creating a playlist of audio segments and video segments for display; and traversing the set of nodes by: integrating the audio and video elements, receiving a selection from the user, and designating the child node as the current node. The system comprises a computer store containing data; a set of nodes and each node has a video and audio element and relationships exist between the nodes; and a computer server that obtains a set of nodes, generates a playlist, displays an audio and video sequence, and traverses the set of nodes.

20 Claims, 11 Drawing Sheets

(56) References Cited

U.S. PATENT DOCUMENTS

| | | | |
|---|---|---|---|
| 2011/0022639 A1* | 1/2011 | Martinsson | G06F 16/2228 707/797 |
| 2011/0314381 A1* | 12/2011 | Fuller | G06F 3/017 715/727 |
| 2012/0254254 A1* | 10/2012 | Milousheff | G06F 16/282 707/802 |
| 2013/0305153 A1* | 11/2013 | Schwarz | G09B 5/062 715/716 |
| 2014/0136186 A1* | 5/2014 | Adami | G06F 17/2264 704/9 |
| 2014/0351679 A1* | 11/2014 | Tobita | G06F 17/243 715/202 |
| 2017/0206140 A1 | 7/2017 | Smith et al. | |
| 2017/0353515 A1 | 12/2017 | Papapanagiotou et al. | |

OTHER PUBLICATIONS

Netflix, Interactive Content on Netflix, Help Center Article, https://help.netflix.com/en/node/62526, 1 page.

\* cited by examiner

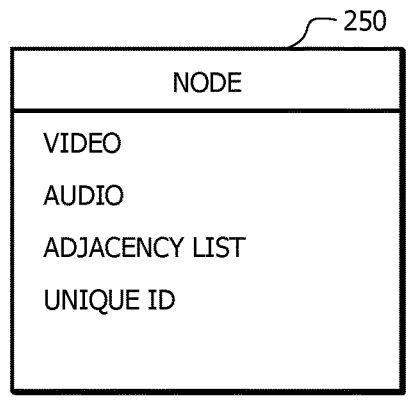
*FIG. 2B*
| NODE ID | PARENT ID | CHILD ID's |
|---------|-----------|------------|
| 0 | 0 | 1, 2, 3 |
| 1 | 0 | 3, 4, 5, 6, 7 |
| 2 | 0 | 4, 5, 15 |
| 3 | 0, 1 | 6, 8 |
| 4 | 1, 2 | 10 |
| 5 | 1, 2 | 10, 14 |
*FIG. 2C*
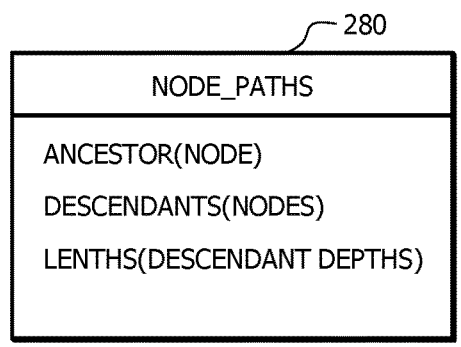
*FIG. 2D*

| ANCESTOR | DESCENDANT | LENGTHS |
|---|---|---|
| 0 | 0, 1, 2, 3, 4, 5, 6, 7, 8, 9, 10, 11, 12, 13, 14, 15 | 0, 1, 1, 1, 2, 2, 2, 2, 2, 3, 3, 4, 4, 3, 3, 2 |
| 1 | 1, 3, 4, 5, 6, 7, 8, 9, 10, 11, 12, 13, 14, 15 | 0, 1, 1, 1, 1, 1, 2, 2, 3, 3, 3, 2, 3 |
| 2 | 2, 4, 5, 8, 9, 10, 11, 12, 13, 14, 15 | 0, 1, 1, 1, 2, 2, 3, 3, 2, 3, 1 |
| 3 | 3, 6, 8, 9, 10, 11, 12, 13, 14, 15 | 0, 1, 1, 2, 3, 4, 3, 2, 4, 2 |
| 4 | 4, 10, 11, 14 | 0, 1, 2, 2 |
| 5 | 5, 10, 11, 14 | 0, 1, 2, 2 |
| 6 | 6, 9, 10, 11, 12, 13, 14 | 0, 1, 2, 3, 2, 2, 3 |
| 7 | 7, 9, 10, 11, 12, 13, 14 | 0, 1, 2, 3, 2, 2, 3 |
| 8 | 8, 9, 10, 11, 12, 13, 14, 15 | 0, 1, 2, 3, 2, 1, 3, 1 |
| 9 | 9, 10, 11, 12, 13, 14 | 0, 1, 2, 1, 1, 2 |
| 10 | 10, 11, 14 | 0, 1, 1 |
| 11 | 11 | 0 |
| 12 | 12 | 0 |
| 13 | 13 | 0 |
| 14 | 14 | 0 |
| 15 | 15 | 0 |

*FIG. 2E*

SYSTEM AND METHOD FOR BRANCHING-PLOT VIDEO CONTENT AND EDITING THEREOF

BACKGROUND OF INVENTION

1. Field of Invention

The present invention relates to a system and a method to create, process, and/or display video and audio content based on user selections during the display of the video and audio content.

2. Description of Related Art Including Information Disclosed Under 37 C.F.R. 1.97 and 1.98

This section is intended to provide a background or context. The description herein may include concepts that could be pursued but are not necessarily ones that have been previously conceived or pursued. Therefore, unless otherwise indicated herein, what is described in this section is not prior art in this application and is not admitted to be prior art by inclusion in this section.

People watch movies like they read a typical book: they watch the movie straight through with no interaction with the movie content and with no deviation from the script created for the movie. Movies, like most books, have a single main plot, and there is no deviation from that single main plot. There are sub-plots to movies and books, but these sub-plots do not deviate from the predetermined script created by the movie creators or by the authors.

In the 1930s, books were created where the reader could choose the actions of the main character and thereby affect the outcome of the main plot. These books were called gamebooks, and required users to make a selection at a branching point. Once the user made a selection, the user then turned to the appropriate page of the book as indicated by the user's selection to continue with the user's selected story. The user continues to make selections until the end of the branch of the story. In this age of digitalization, gamebooks are becoming digital but they are still literary works in that gamebooks are still textual works with or without illustrations.

While both movies and video games today have scripts that narrate a plot and provide moving visuals for a viewer as compared to the text of a literary work, today only video games allow for users or viewers to interact with the plot script. For example, video games allow users to act as the protagonist of the narrative of the video game, and thereby allow the users to make choices about actions of the protagonist of the video game, which in turn affects the plot and outcome of the narrative. Movies do not allow for the same type of interaction as video games because there are no devices that allow for interaction by the user and movies are not designed or written with different outcomes in mind. Generally, viewers of movies only have time for one outcome of the narrative, based on the decisions made by the movie creators.

What is needed is a system and method that allows for movie creators to create movies that allow for multiple outcomes of a story or narrative, and that also allows for viewers to interact with these movies to choose the outcome of the story or narrative.

BRIEF SUMMARY

In certain exemplary embodiments described, methods and system support branching-plot movie content, video and audio thereof. The disclosed technique and related system comprise obtaining, from a central database, a set of nodes, wherein each node of the set of nodes comprises an audio element, a video element, and a set of node branches, wherein at least one node of the set of nodes comprises a parent node identifier and at least one child node identifier; obtaining, from the central database, a relational table comprising the node branches of each node of the set of nodes to other nodes of the set of nodes based on each node's parent node identifier and the at least one child node identifier; designating a node of the set of nodes as the current node; creating a playlist of audio segments and video segments for display to a user; traversing the set of nodes by: integrating the video element and audio element of the current node into the playlist; rearranging the playlist based on the newly integrating video element and audio element; displaying the video segment and the audio segment of the playlist; receiving a selection from the user, wherein the selection corresponds to a relationship of the current node on the relational table to a child node of the current node; and based on the selection, designating the child node as the current node.

Other embodiments are also disclosed herein. Another embodiment provides that a second subset of nodes is preselected for traversal. Yet another embodiment further comprises a second subset of nodes that are end nodes. At least one node in a particular embodiment is a root node. Also, another embodiment provides for a non-relational database for storage and metric data to be retrieved. A user may backtrack through the set of nodes of an embodiment based on a second node branch different from the selection. In addition, one embodiment during the traversal of the set of nodes displays a plurality of node branches to the user for selection. One or more of the node branches can be restricted from being selected by the user. Upon a condition being satisfied, the one or more node branches that were restricted from selection by the user may be made available for selection by the user. In one example of an embodiment, the condition is satisfied by the user completing at least one traversal through the set of nodes.

The disclosed principles can also be provided through a system for displaying a branching-plot movie to a remote computer. The system comprises a computer store containing data, for the branching-plot movie, comprising audio and video elements. The branching-plot movie comprises a set of nodes. Each node comprises a video element and an audio element. Relationships of each node of the sets of nodes is provided in a relationship table. A computer server coupled to the computer store through a computer network is programmed to: obtain, from the computer store, the set of nodes of the branching-plot movie; generate an audio and video sequence of audio elements and video elements, wherein the audio and video sequence comprises at least one video element and at least one audio element; and provide a viewer application to the remote computer, wherein the viewer application displays a graphical representation of the audio and video sequence. In addition, the computer server is programmed to traverse the set of nodes by: displaying at least one video element and at least one audio element of the audio and video sequence on the view application of the remote computer; receiving a selection from the user through the view application, wherein the selection comprises a relationship of the relational table; retrieving, based on the selection, from the computer store, and adding, to the audio and video sequence, a second video segment and a second audio segment of the selected node; and automatically rearranging the audio elements and the video elements for the audio and video sequence based on the selection from the user.

In another embodiment of the system, a second subset of the set of nodes is preselected for traversal. Yet another embodiment allows for backtracking through the set of nodes based on a second node branch different from the selection. One of the nodes in a particular embodiment of the system can be a root node. An embodiment of the system can comprise a non-relational database for storage and retrieval of metrics data. One embodiment allows for the plurality of node branches to be displayed to the user while the set of nodes is being traversed. One or more node branches can be restricted from being selected by the user. In one embodiment, a condition can be satisfied upon which the node branches that were restricted from being selected by the user are no longer restricted and the user can select formally restricted node branches. The condition, in one example of an embodiment, is satisfied when the user completes at least one traversal through he set of nodes.

BRIEF DESCRIPTION OF THE DRAWINGS

The present invention will be more fully understood by reference to the following detailed description of the preferred embodiments of the present invention when read in conjunction with the accompanying drawings, wherein:

FIG. 2B provides an exemplary structure of a node;

FIG. 2C is an exemplary structure of a relational table;

FIG. 2D provides an exemplary structure of a node path;

FIG. 2E is an exemplary structure of a closure table;

Figure 1:
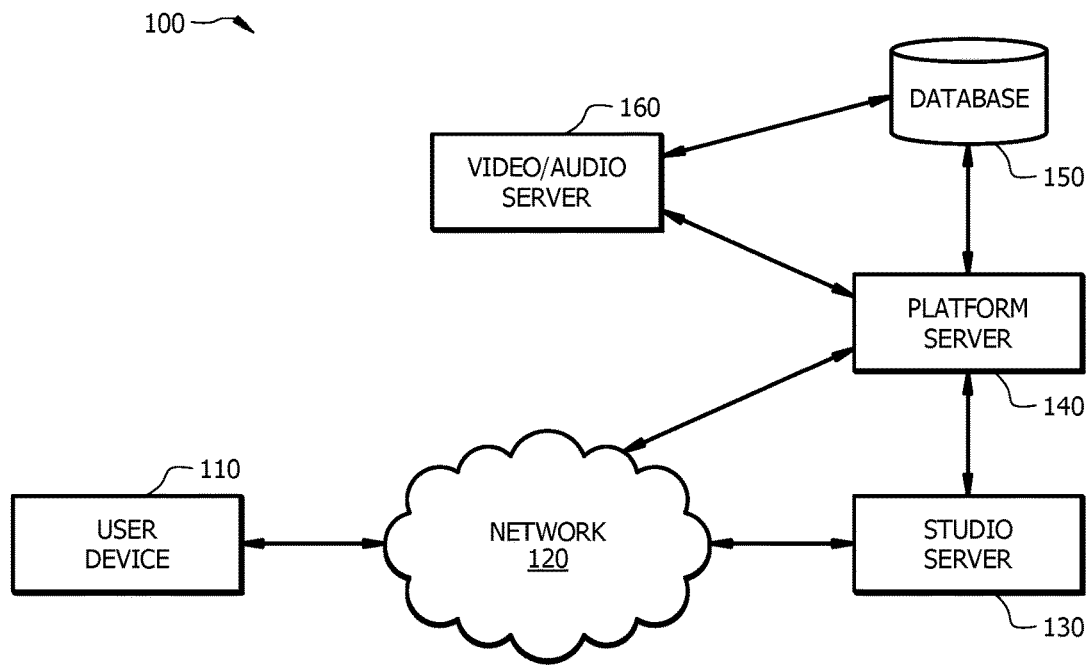
FIG. 1 illustrates a block diagram of an exemplary branching-plot movie content system in accordance with one or more embodiments.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION

The disclosed principles provide a number of innovations, including novel systems and method for facilitating and creating branching-plot movie content and a platform for such. The platform disclosed herein may also be used for any other type of branching-plot content, such as automated literary works. A detailed discussion of the exemplary platform is provided below; however, it should be understood that the embodiments described herein are only exemplary and do not limit the broader scope of the disclosed principles.

Generally speaking, the exemplary branching-plot movie platform facilitated by the disclosed principles involves acquiring a set of video and audio elements represented as a directed acyclic graph, and using a predetermined relational table as a backdrop against structuring a sequence of video and audio elements to be viewed by the user. The user selects a branching-plot movie to watch, and at predetermined time periods during the movie, the user makes a selection on how the movie should proceed forward. This selection determines the next video and audio elements to be viewed by the viewer based on the relational table. This display-and-selection repeats until the user reaches one of the ends of the movie.

A movie as described herein is a set of video and audio elements that can be arranged together to tell one story or multiple stories. When used with the exemplary technique, a user can watch the video and audio elements in various permutations in order to achieve different results based on the selections made during viewing. A movie can have multiple plots (also known as paths) or multiple endings, and the selection made by the user determines which plot the user achieves in the end. The exemplary branching-plot movie platform allows movie creators to create video and audio elements that can be arranged in different sequences to create different plots and endings, and the video and audio elements can be edited or modified as needed to provide the maximum entertainment for users.

In the exemplary embodiment, a movie comprises a set of nodes, with each node comprising a video element and an audio element, formed into a directed acyclic graph. As with all directed acyclic graphs, one of the nodes is a root node, and the video element and audio element of the root node is the start of the movie to be viewed by the user. Each node also comprises node branches, also called node paths, connecting each node to other nodes. The root node only has node branches to child nodes, while ending nodes only have node branches to parent nodes. These node branches are represented in a relational table or a closure table, which stores the transitive closure of all possible parent-child relations of the nodes of the movie. The transitive closure allows the reachability of each node of the set of nodes to use the least amount of time, and therefore the use of a relational table for the node branches is more efficient as compared to adjacency lists or incidence matrixes. In the exemplary embodiment, the movie with all its potential plots and endings are stored in a central database, along with the relational table.

In some embodiments, the movie can have multiple root nodes and thereby allowing movie creators more flexibility in arranging video and audio elements to create multiple plots and endings. In some embodiments, a node has multiple parent nodes and multiple child nodes, depending on the arrangement of nodes to form plots or paths of the movie. The creation and arrangement of the plots and endings of a movie are disclosed further below.

In an exemplary embodiment, when a user chooses a branching-plot movie to view, a playlist is created comprising of the video and audio elements of a root node of the movie, and the video and audio elements of the playlist are displayed for the user. A playlist is used herein to describe a sequence of audio and video elements to be displayed. During the display of the video and audio elements, multiple choices are posed to the user, and the user selects one of the multiple choices. The user's selection determines which child node of the root node is traversed next. Accordingly, the video and audio elements of the child node are then integrated into the playlist and then displayed for the user. The user then selects one of the multiple choices of the child node, which determines which child node of the child node is traversed then. This process is repeated until an ending node is reached, which has no relationship with any child nodes. Once the ending node is reached, the path is completed and the user has finished viewing one of the plots of the movie.

In some embodiments, the user can replay the movie and select different choices to arrive at a different ending as compared to the first playthrough. A playthrough is an iteration of the movie from start to finish. For example, the first playthrough comprises the user watching the movie for a first time and making selections for a first time. In some embodiments, each playthrough of the movie creates a new playlist of video and audio elements because each playthrough comprises the user making different selections and thereby the playlist changes based on the different selections.

In some embodiments, the movie comprises a default playlist. The default playlist comprises video and audio elements of the root node, and further comprises video and audio elements of a subset of nodes. The video and audio elements of this subset of nodes form one of the multiple plots and endings of the movie, and so the choices of this subset of nodes are preselected for the user. In some embodiments, this default playlist can be created by the movie creator, and in other embodiments, this default playlist comprises the video and audio elements of the first listed child node of each node in the set of nodes.

A movie creator is herein used to describe authors of video and audio content that create sequences of video and audio content to tell one or more stories using the disclosed technique and any system or method using any embodiments or techniques disclosed herein.

In an exemplary embodiment, to create a movie on the branching-plot movie platform, movie creators can upload video and audio elements onto the platform. The platform provides an application that allows movie creators to create visual representations of the movie and the various node branches leading to different nodes of the set of nodes, by creating playlists of video and audio elements. As the movie creators upload video and audio content onto the platform, nodes are created to denote video and audio elements, and when the movie creators arrange audio and video elements of the nodes into a sequence, a movie is formed from the set of nodes used to create a plot. Also, during the arrangement of audio and video elements into a sequence, adjacency lists for each node are created and modified based on the arrangement of audio and video elements of the nodes by the movie creator. The arrangement created by the movie creators indicates the parent and child nodes in the plot or path of the movie. Further, the movie comprises multiple plots or branching plots when the movie creators create different arrangements that are integrated into other arrangements of video and audio elements by setting up choices for the user to select during viewing. Each playlist of video and audio elements created by the movie creators forms a plot or path of the movie.

In some embodiments, the movie creator uploads one file comprising video and audio content, and can create the multiple plots or branching plots by creating nodes using discrete time ranges of the video and audio content. For example, the root node corresponds to the first two minutes of video and audio content of a single mp4 file, while a first child node of the root node corresponds to the second two minutes of video and audio content of the mp4 file and the second child node of the root node corresponds to time frame 4:01 to 10:00. Any combination of time frames can be used for the video and audio elements of the nodes of the set of nodes.

In the exemplary embodiment, once the movie creator has completed forming the multiple plots or branching plots of the movie, a relational table is created that corresponds to the relationships of each node to other nodes of the set of nodes. Each node has a unique identifier, and the relational table uses the nodes' unique identifiers to indicate the parent nodes and child nodes. In some embodiments, adjacency lists and incidence matrices can be used instead of relational tables for establishing the connections between the nodes. In some embodiments, adjacency lists are used concurrently with a relational table for more efficient traversal of the nodes. In some embodiments, after the adjacency lists and incidence matrices are created, a relational table can be created based on the adjacency lists and incidence matrices because a relational table is more efficient for traversal of the nodes to create the playlists as compared to adjacency lists or incidence matrices.

In some embodiments, the plot or paths of the movie are dependent on previous choices made by the user, and thereby the choices provided to the user can be dependent on the combination of choices made by the user and thereby changes and determines the ending of the playthrough. In some embodiments, the plot or paths of the movie are dependent on previous playthroughs of the movie. For example, a choice for a third plot of a movie is only available after choices for the first plot and the second plot are selected in previous playthroughs. Accordingly, this option encourages users to go through multiple playthroughs of a movie in order to reach an ending normally not available.

In some embodiments, the user has at least two choices but no more than six choices. Users may have difficulty in selecting a choice when presented with more than six choices, and to reduce this difficulty for users, some embodiments have a limited number of choices for users.

In some embodiments, a user may want to back track through a completed plot or path in order to take routes not taken during the previous playthrough. When a user backtracks through the path of a previous playthrough, the platform creates a new playthrough and corresponding playlist up until the choice that the user wants to change. For example, the user has gone through a first playthrough of the movie, and wants to find how what happened had he selected the other choice of his last selection. This other choice can lead to another ending node, or to another node with parent and child node branches. The new playthrough created by backtracking does not finish until the user reaches an ending node. In some embodiments, the user can backtrack through completed playthroughs, and other embodiments the user can backtrack through incomplete playthroughs.

The disclosed exemplary platform can be used with any type of video service currently available or later developed, including live streaming services and peer-to-peer streaming, and with any type of protocol of video. The disclosed exemplary platform can also be used with any type of video format and with any type of audio format currently available or later developed.

The advantage of the exemplary embodiments herein allow for less hardware, and for more efficient computing to accomplish the disclosed principles because the paths and plots of a movie are already known and represented in a relational table.

Exemplary applications can be implemented via one or more secure websites, or other similar dedicated sites accessible via a computer network. While in one embodiment the disclosed techniques are used with mobile computing devices, in another embodiment, the disclosed techniques may be used with any combination of mobile computing devices and computing components or devices. Other embodiments can provide specific capabilities with the disclosed techniques facilitated by a subscription to access additional content.

FIG. 1 illustrates a block diagram of an exemplary branching-plot movie content system 100 in accordance with one or more embodiments. The exemplary system 100 can use the principles as disclosed with the branching plot movie technique and platform. The branching-plot movie system 100 facilitates the creation and display of branching-plot movies that have multiple plots and multiple endings. The branching plot movie system 100 uses a user computing device 110 and a client application on the computing device. The client application on the computing device 110 (also called a client terminal) can connect to and access other application and other available technology on the computing device 110. For example, the client application can access any connected input and output devices, including cameras, microphones, and multimedia devices. The client application provides a graphical user interface for user interaction and to display the video and audio elements of the branching-plot movie. As mentioned, the client application interfaces with input and output devices of the mobile device, such as a touchscreen of a smart phone. The client application can have access to a user's geographical location, location data, product and social network data, and communications protocols. Although the exemplary embodiment illustrates a single computing device 110, any number of computing device can be used with the branching-plot movie system 100.

One or more computing devices 110, each with a client application, may be coordinated by a central movie server 140, and can comprise mobile telephones, personal data assistants, tablet computers, notebook computers, and any other type of computer device. Within the branching-plot movie system 100, the computing device is configured to connect to the movie server 140 via a computer network 120, such as the Internet. The movie server 140, which is also referred to herein as the platform server, is also configured to the computer network 120, such as the Internet. In other embodiments, the computer network 120 can be a private access network. Of course, other means of connecting the computing device 110 and the movie server 140 to a computer network 120 may also be used, either currently existing or later developed.

In an exemplary embodiment, the system 100 includes video processing services and streaming processes of the computing device 110 associated with users accessing the system 100. In one embodiment, the system 100 comprises codecs for encoding and decoding video and audio data, and these codecs may be located locally on the computing device 110. In another embodiment, the system facilitates the transmission digital video and audio content through data containers, such as Flash or RTMP. The system 100 and the computing device 110 can use any currently available or later developed technology for delivering digital video and audio content over a computer network 120 to the computing device 110 for processing and display.

Still further, the computing device 110 comprises an application loaded thereon that facilitates the creation, processing, and display of branching-plot movies. In some embodiments, instead of an application loaded thereon, the user can access a website through the computing device, and the website hosts or facilitates a graphical user interface for accessing the platform server 140, the studio server 130, or any other component of the system 100.

The movie server 140 can be a centralized computing system or a device for coordinating a plurality of computing devices 110. The movie server 140 coordinate and communicates through a computer network 120 such as the Internet with a studio server 130, video/audio server 160, and other services available to the computing device 110. The movie server 140 also communicates and coordinates with a database 150 for user information, video and audio information, movie information, and information collected from the computing device 110. The database 150 may also comprise data from movie creators, including the movies, corresponding video and audio data of the movies, the movie nodes, the relational tables of the movies, and any other information corresponding to the movies.

The movie server 140 can comprise a front end server for handling data requests or web page requests from users, processing the requests and returning the data, an application programming interface server, a database server, and a backend server for handling the processing of the movie data, such as processing the traversal of the nodes of the movie. The movie server 140 can also contain any number of servers required to operate the interactions between the movie server 140, the computing device 110, the studio server, the video/audio server, and any other component of the system 100.

Like the movie server 140, the studio server can be a centralized computing system or device for coordinating a plurality of computing device 110; however, the studio server comprises the infrastructure for creating the branching-plot movies as disclosed previously. The studio server 130 coordinates and communicates through a computer network 120 such as the Internet with the computing device 110, and in some embodiments, the studio server 130 can directly communicate and coordinate with the platform server 140. The studio server 130 receives information and data from the video/audio server 160 and from the database 150 through the platform server 140. The studio server 130 can also comprise a front end server for handling data requests or web page requests for users, specifically from movie creators, and for processing the requests and returning the data. In some embodiments, the studio server 130 comprises an application programming interface that works through the platform server 140. In other embodiments, the studio server uses the application programming interface server of the platform server 140. Accordingly, the system 100 can provide a graphical user interface for movie creators to create movies through uploading and arranging audio and video content through the platform server 140 and the studio server 130. The studio server 130 can contain any number of servers required to operate the interactions between it, the platform server, and the computing device 110, and any other component of the system 100.

The video/audio server 160 of the branching-plot movie system 100 provides the infrastructure for the video/audio content uploaded by the movie creators and displayed to the users. The video/audio server 160 also facilitates the transmission of data (audio and video) to the platform server 140 from the database 150. The video/audio server 160 can interact and facilitate any type of video and audio file format and comprises processes for the encoding and decoding of video and audio content. The video audio server 160 can interact with the platform server 140 to create a graphical user interface within the client application for display of audio and video content to the users, and also for the creation of movies in conjunction with the studio server 130. Any currently available or later developed video and audio protocol can be used with the video/audio server 160.

In some embodiments, the video/audio server 160 can comprise a subtitle engine or a closed-captioning engine to transcribe the audio into text. The transcribed text is then stored with the branching-plot movie in the database 150, so that when the branching-plot movie is displayed, the transcribed text can also be displayed as a layer on top of the video content of the branching-plot movie.

In addition to facilitating, creating, and displaying branching-plot movie content, the system 100 keeps track of user information. In one embodiment, the system 100 compiles user profiles of the users' information comprising user history. In some embodiments, the system 100 can access third party data sources to get user information. For example, the system 100 can access Facebook services in order to get user information and authentication information, and accordingly, the user can use Facebook to create an account in the system 100. Other social media verification data sources can be used, currently existing or later developed.

The use of social media resources is not required because users are able to create a user account with the system 100 without the use of social media information. The use of social media allows for easier and faster user authentication because in some exemplary embodiments, users can be required to input their username and password upon each activation of the system 100.

As mentioned previously, the system 100 can provide a graphical user interface for movie creators to create branching-plot movie content or to configure any advertising or sponsored content for particular branching-plot movies. In yet another embodiment, the graphical user interface allows users to view the branching-plot movie content and to select the choices of the branching-plot movie to create a playlist of video and audio elements. Further discussion regarding creating the branching-plot movie and display thereof is below.

Figure 2A:
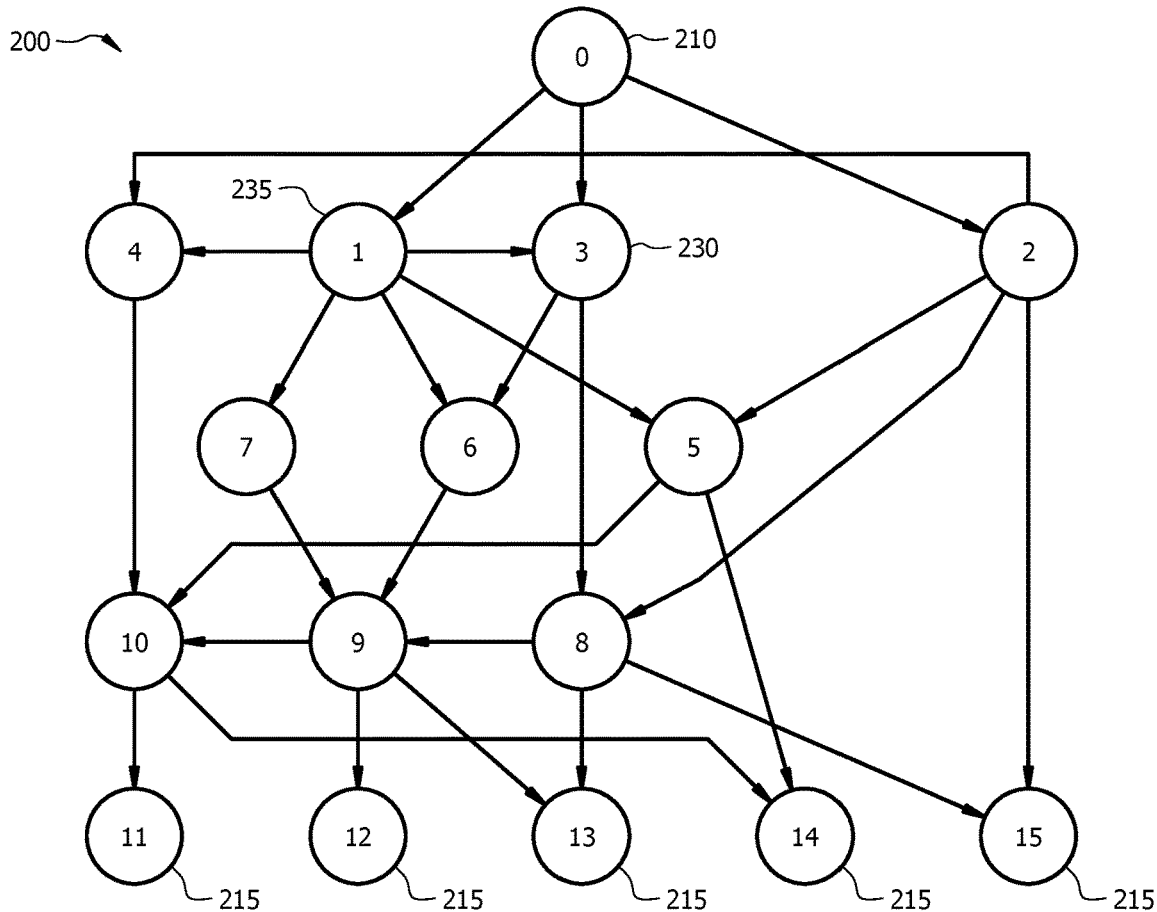
FIG. 2A is an exemplary illustration of a directed acyclic graph representing the plots and paths of a branching-plot movie.

FIG. 2A is an exemplary illustration of a directed acyclic graph 200 representing the plots and paths of a branching-plot movie. FIGS. 2B and 2C are exemplary illustrations of the underlying data structure supporting the directed acyclic graph 200 (also known as a set of nodes). As previously discussed, each node of the set of nodes 200 comprises video and audio elements.

The set of nodes 200 are formed when movie creators upload video and audio content to the system 100 through the computing device 110 to the platform server 140. The platform server 140 stores the uploaded video and audio content into the database 150. During the upload process, the movie creator has the option of uploading the video and audio content as multiple files, where each file corresponds to the video and audio content of a node. In another embodiment, the movie creator has the option of uploading a single audio and video file that corresponds to all video and audio content of every node in the movie. In this embodiment, the movie creator can designate the video and audio elements corresponding to a node through the time frames of the single file, and the intervals between these time frames can vary in duration and amount. Each node is then assigned a unique identifier. Once the various nodes are created, a visual representation of the nodes is displayed to the movie creator in the graphical user interface as separate video and audio elements to be arranged together.

Using the visual representation of the nodes, a movie creator can arrange the nodes into particular arrangements. The arrangements correspond to plots and paths as told by the movie creator. Some of the plots and paths share the same nodes as other plots and paths, and therefore some nodes can have more than one parent node and more than one child node. The graphical user interface assists with the visual arrangement of the nodes to form the multiple plots and paths of the branching-plot movie.

FIG. 2A is a graphical representation of an exemplary branching-plot movie. In this exemplary representation, the branching-plot movie comprises a single root node 210 and multiple ending nodes 215. As mentioned previously, the root node 210 have node branches linking the root node 210 to only child nodes, and the ending nodes 215 have node branches linking the ending nodes 215 to only parent nodes. Accordingly, the branching-plot movie only has one beginning and has 5 endings, but has 35 paths and plots that tell different stories.

The branching-plot movie created by the movie creator can be structured in any arrangement in order to tell the story or stories the movie creator is conveying. Some nodes have a different number of node branches, for both node branches connecting the node to parent nodes and node branches connecting the node to child nodes. The nodes of a branching-plot movie do not need to adhere to a hierarchy of nodes in that nodes may be connected to other nodes in any arrangement and combination. In some embodiments, child nodes of the root node are only child nodes of the root node, and cannot be child nodes of any other nodes. In some embodiments, the child nodes of the root node can be child nodes of other nodes besides the root node, as shown with node 230 that is a child of the root node 210 and the child of node 235. Of course, the node branches formed between nodes are created when the movie creator arranges the nodes in sequences for the plots and paths of the branching-plot movie.

FIG. 2B provides an exemplary structure of a node. In the exemplary embodiment, the node 250 comprises a video element, an audio element, an adjacency list, and a unique identifier. As mentioned previously, the video element and audio element can be a single file, or these elements can be timeframe markers of a larger file to indicate certain timeframes of the larger file. For example, the root node corresponds to the first two minutes of video and audio content of a single mp4 file, while a first child node of the root node corresponds to the second two minutes of video and audio content of the mp4 file and the second child node of the root node corresponds to time frame 4:01 to 10:00. In the exemplary embodiment, the node comprises an adjacency list, which lists the neighbors of a node. In one embodiment, the adjacency list provides the child nodes of the nodes, and thereby provides the node branches between the node 250 and the child nodes. In another embodiment, the node comprises two adjacency lists: one for child nodes of the node 250, and one for parent nodes of the node 250. Further, the node 250 comprises a unique identifier for accurately connecting the node 250 with the other nodes of the system 100. The adjacency lists of the nodes and the relational table use the unique identifiers of nodes in order to expedite traversal and identification of nodes in the system 100.

In the exemplary embodiment, the node also comprises the question text and the choice text. The choice text corresponds to each child of the adjacency list, and the question text provides the context for the choice text. The movie creator creates the question text and the choice text during the arrangement of nodes and creation of different plots and paths of the branching-plot movie. The movie creator also designates when the question text and the choice text is displayed to the user for selection. For example, the movie creator indicates that the question text and choice text is displayed a minute before the end of the video element and audio element being displayed.

FIG. 2C is an exemplary structure of a relational table. As mentioned previously, in an exemplary embodiment, once the movie creators have finished with arranging the nodes 250 into the multiple plots and paths thereby completing the adjacency lists of the nodes, the system 100 creates a relational table that sets forth the unique identifier of each node, the unique identifiers of the parent nodes of each node, and the unique identifiers of the child nodes of each node. FIG. 2C only shows six nodes with the corresponding parent nodes and child nodes for exemplary purposes. The relational table or closure table as shown in FIG. 2C can vary in size depending on the size of the branching-plot movie.

In some embodiments, the relational table provides all possible connections between connected nodes, and indicates the depth or distance between the nodes. For example, the relational table lists out a path from node 265 to node 270 with a depth of 2. In this embodiment, the relational table provides only paths are possible based on the direction of the branching-plot movie.

Once the relational table is created, the branching-plot movie is ready for viewing by users. In some embodiments, the system 100 may require approval of the branching-plot movie by an administrator of the system so the movie conforms to the administrator's standard. In some embodiments, the system 100 may go through a verification process prior to publication to the public for viewing.

As mentioned previously, the user of the system 100 can select a published branching-plot movie for viewing. When the user selects the branching-plot movie for viewing, a playlist is created with the video element and audio element of the root node placed first into the playlist. The system 100 then starts playing the playlist and so the video element and audio element of the root node is displayed for viewing by the user. At a designated time, the question text and choice text for the root node is displayed to the user, and the user is given the opportunity to select one of the choices of the choice text in response to the question text. The user has until the end of the video element and audio element to select one of the choices of the choice text. If a choice is not selected before the end of the video element and audio element of the root node, then the last frame of the video element is displayed until the user selects a choice.

When the user selects one of the choices of the choice text of the root node, because each choice corresponds to a node branch of the root node, the node branch of the root node is selected and the next node connected to the root node via the selected node branch is also selected. Accordingly, the video element and audio element of this next node is added and integrated into the playlist and any existing video elements and audio elements of the playlist are rearranged to correspond to the nodes previously selected. Then the playlist continues displaying video and audio, at this point, the video element and audio element of the next node. Again, when the designated time is reached, the question text and the choice text of the next node are displayed for the user. Again, the user has the opportunity to choose one of the choices presented via the choice text, and this choice corresponds to a node branch and corresponding child node of the next node. Once the user selects a choice, the corresponding child node becomes the new current node and the video element and audio element of this new current node is added and integrated into the playlist and any existing video elements and audio elements of the playlist are rearranged to correspond to the nodes previously selected. According, the process of choosing and updating the playlist repeats until an ending node is reached.

Like with other nodes, the video element and audio element of the ending node are also added into the playlist and integrated with the playlist, and the existing video elements and audio elements of the playlist are rearranged to correspond to the nodes previously selected. The ending node does not have question text or choice text because the ending node is the last node of a path or plot. So when the current node is an ending node, no question text or choice text is displayed, and when the user reaches the end of the video element and audio element of the ending node, the plot and path are complete and the user has completed a playthrough of the branching-plot movie. Some embodiments allow for different options for the user upon reaching the end of a plot, such as back-tracking or starting another playthrough with choices available only after certain conditions are met.

In one embodiment, the playlist is pre-populated by video elements and audio elements of a subset of nodes of the branching-plot movie upon selection of the movie by the user. In this embodiment, a plot or path is preselected for the user, and this plot or path is formed from a subset of nodes of the set of nodes of the branching-plot movie. Accordingly, the video elements and audio elements of each node of this subset of nodes populate the playlist. During the process of displaying video and audio elements of this pre-populated playlist to the user, the user still has the opportunity to make choices from the choice text in the context of the question text of the current node. The selected choice may not correspond to a node in the subset of nodes, so the system 100 rearranges the playlist to include and integrate the video element and audio element of the user's chosen node not within the subset. In one embodiment, the system 100 can then re-populate the playlist after the integration of the user's chosen node by integrating video elements and audio elements with a new subset of nodes based on the user's chosen node. In another embodiment, the system 100 can remove any video element or audio element from the playlist that does not appear in a plot or path with the user's chosen node. In yet another embodiment, the system 100 can remove any video element or audio element from the playlist after the integration of the video and audio elements of the user's chosen node.

As mentioned previously, in one embodiment, the user can backtrack through a previous playthrough to explore choices not selected in the previous playthrough. Because the user has gone through the branching-plot movie once per the previous playthrough, a playlist was already created for the previous playthrough. A user can choose any node of this playthrough through its corresponding video and audio elements, and this node is where the system 100 starts the new playthrough and playlist. During this backtracking process, the new playlist is populated with the video and audio elements of nodes of the previous playlist up until the user's chosen backtrack node. In another embodiment, the system 100 can duplicate the contents of the previous playlist into the new playlist and after the user selects a choice and corresponding child node not a part of the previous playlist, the system can remove any video element or audio element from the new playlist that does not appear in a plot or path based on the user's new choice.

FIG. 2D is an exemplary embodiment of a node path 280. In the exemplary embodiment, the node path 280 has an ancestor element, descendants element, and a lengths element. Wherein the ancestor element stores the parent node, descendants elements stores the children, and lengths element stores the depth of each of the children.

FIG. 2E is an exemplary embodiment of a closure table 290 for storing the node paths 280. Closure table 290 corresponds with the graphical representation of the exemplary branching-plot movie set out in FIG. 2A. In the exemplary embodiment, a movie director has arranged the nodes into multiple plots and paths. As previously stated, following the arrangement of the nodes, the system 100 creates a closure table that sets forth the ancestor of each node path, all of the descendants of the node path, and the lengths (depth) of the descendants. The length (depth) is calculated by determining the shortest path from the ancestor node to the descendant node. Therefore, even if a longer path between an ancestor node and its descendants exists, the length (depth) is stored in accordance with the shortest path. A closure table is the representation of a table for storing all of the node paths 280, also called transitive closures, from one node in the set of nodes to another one of its descendant nodes. From the closure table, a node of the set of nodes can reach its descendant nodes in the least amount of time. Thus, using the closure table increases the efficiency in terms of reachability when compared to adjacency lists or incidence matrixes.

For example, in the present embodiment, the third entry in the closure table 290, that correlates with the third row, has an ancestor identified as node 3. This ancestor node is listed under the first column of FIG. 2E. Accordingly, the node path with an ancestor identified as 3 can have nodes 3, 6, 8, 9, 10, 11, 12, 13, 14, and 15 as its descendants. This list of descendants is located under the second column of FIG. 2E. The third column of FIG. 2E contains the length (depth) of each of the potential descendants from the identified ancestor node—i.e., the node identified as 3. Looking at the lengths listed for the third entry, the node 3 descendant has a length (depth) of 0, the node 6 descendant has a length (depth) of 1, the node 8 descendant has a length (depth) of 1, the node 9 descendant has a length (depth) of 2, etc. While it may seem counterintuitive, each node path 280 includes its ancestor as a descendant as well—e.g., the entry from the immediate example described above has an identified ancestor of node 3 and a possible descendant as node 3. Of note, however, is that the ancestor node that is also listed as a descendant has a length (depth) of 0. This is done in order to facilitate the filling out the rest of the relations in the set of nodes.

Figure 3:
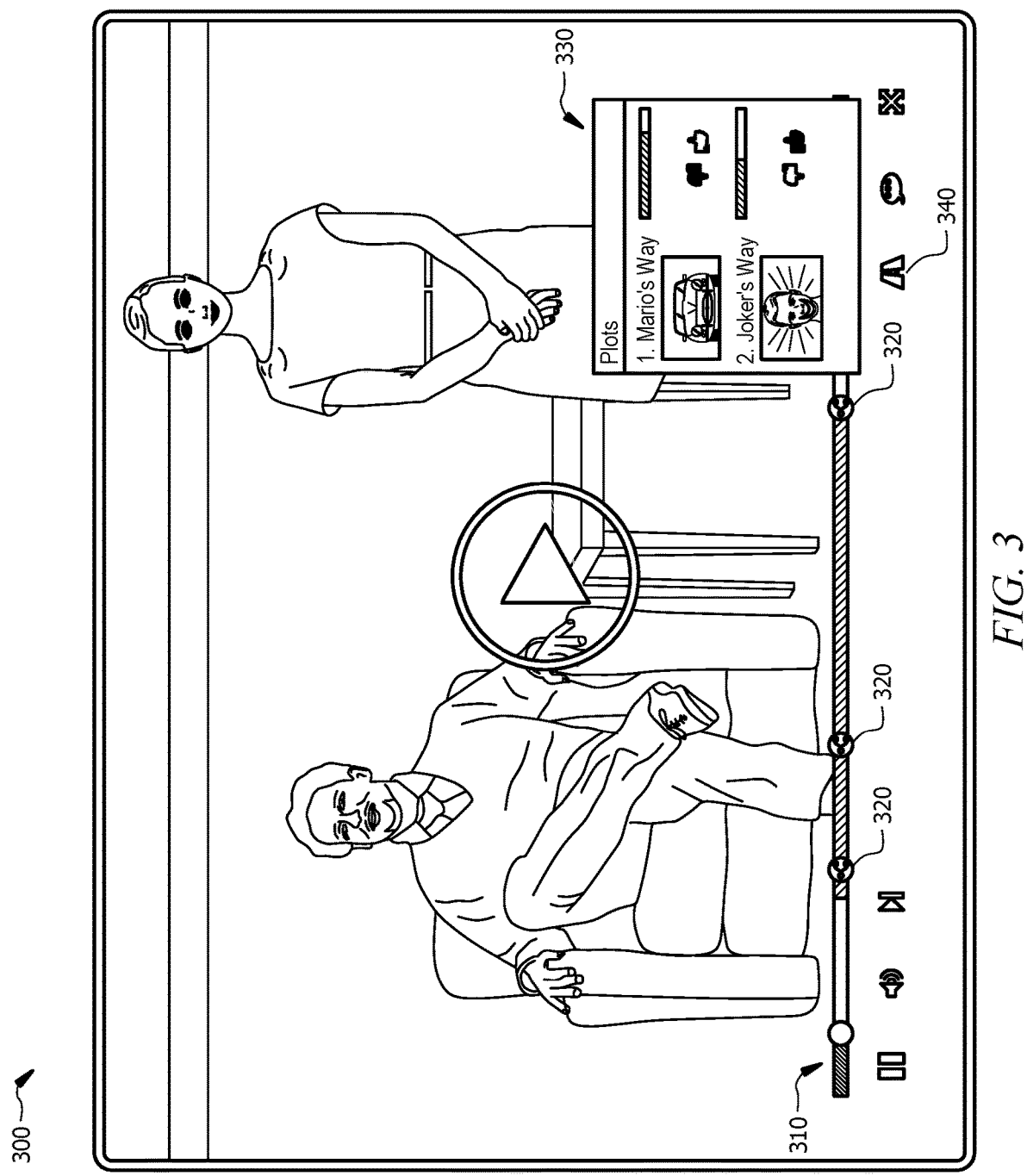
FIG. 3 illustrates an exemplary embodiment of a screenshot of a graphical user interface, in accordance with the disclosed principles, for a branching-plot movie.

FIG. 3 illustrates an exemplary embodiment of a screenshot 300 of a graphical user interface, in accordance with the disclosed principles, for a branching-plot movie with information about the multiple plots of the movie. The screenshot 300 provides an exemplary visual representation of a playlist 310 of the branching-plot movie. The visual representation of the playlist 310 includes visual representations of node branches 320. These visual representations of node branches 320 separate the video and audio elements of different nodes, and also visually indicate to the user that he will need to select from choices at a certain point. The placement of the visual representations of node branches 320 depends on the duration of the video and audio element of a node as compared to the total duration of a plot or path including the current node.

In the exemplary embodiment, a list 330 of plots or paths are displayed for users. The list 330 comprises at least one of the many plots or paths of a branching-plot movie. In one embodiment, the list 330 does not appear in the graphical user interface if the user has not gone through a first playthrough, and the list 330 appears only if the user has completed at least one play through. In another embodiment, the list 330 populates only plots that the user has viewed.

In the exemplary embodiment, the visual representations of the playlist 310 and the node branches 320 are layered on top of the video element of the current node. In other embodiments, the visual representations of the playlist 310 and the node branches 320 are displayed separate from the video element of the current node. In addition, plot icon 340 removes the node branches 320 from the playlist 310 and allows for linear playthrough by the user with no choices for the user to select ever presented to the user during the user's current playthrough.

Figure 4:
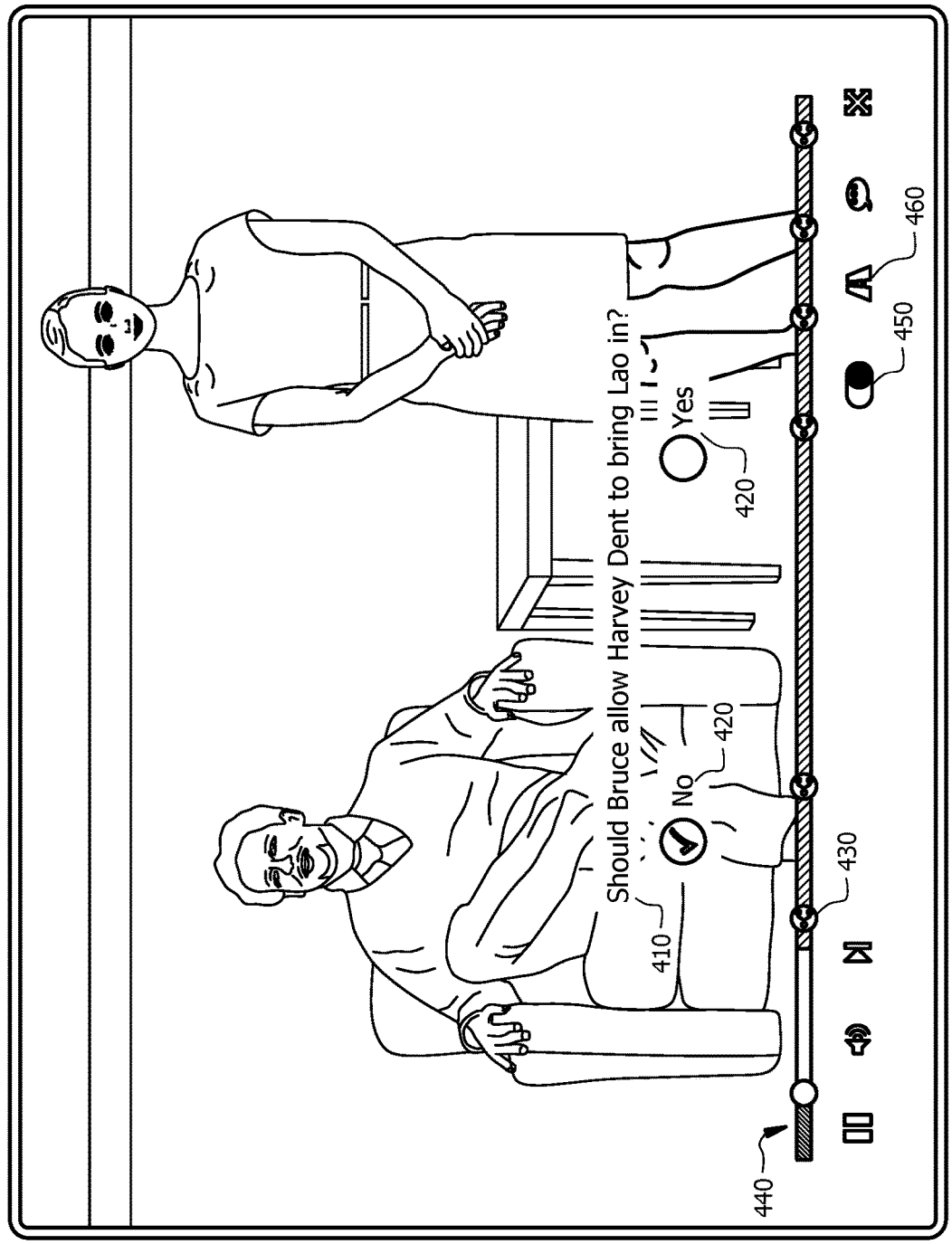
FIG. 4 illustrates an exemplary embodiment of a screenshot of a graphical user interface, in accordance with the disclosed principles, for a branching-plot movie.

FIG. 4 illustrates an exemplary embodiment of a screenshot 400 of a graphical user interface, in accordance with the disclosed principles, for a branching-plot movie with the question text 410 and choice text 420 of the current node displayed for the user. In the exemplary screenshot 400, one of the choices has already been chosen by the user prior to the user reaching the visual representation of the node branch 430 on the playlist 440. The user is allowed to change his selection at any time prior to reaching the end of the video element of the current node. As mentioned previously, the choices presented via the choice text can vary in number depending on the movie creator.

In the exemplary embodiment, the question text 410 and the choice text, like visual representations of the playlist 440 and the node branches 430 are layered on top of the video element of the current node. In other embodiments, the question text 420 and the choice text are displayed separate from the video element of the current node.

Also, the exemplary screenshot 400 shows an auto-select toggle 450 for pre-selecting one of the choices of the choice text 420. In the exemplary screenshot 400, the toggle 450 is set to automatically select one of the choices of the choice text 420 of the current node. In one embodiment, the toggle also permits the system to populate the playlist 440 with video elements of nodes corresponding to the automatically selected choices. The automatically selected choices and corresponding nodes can be set as a default for the auto-select toggle 450 by either the movie creator or the system 100. Alternatively, the user can select the plot icon 460 and all paths will be preselected for the user without the user being given the option to select their own. When plot icon 460 is selected, all node branches 430 are removed from the playlist 440 and the user experiences a linear playthrough.

Figure 5:
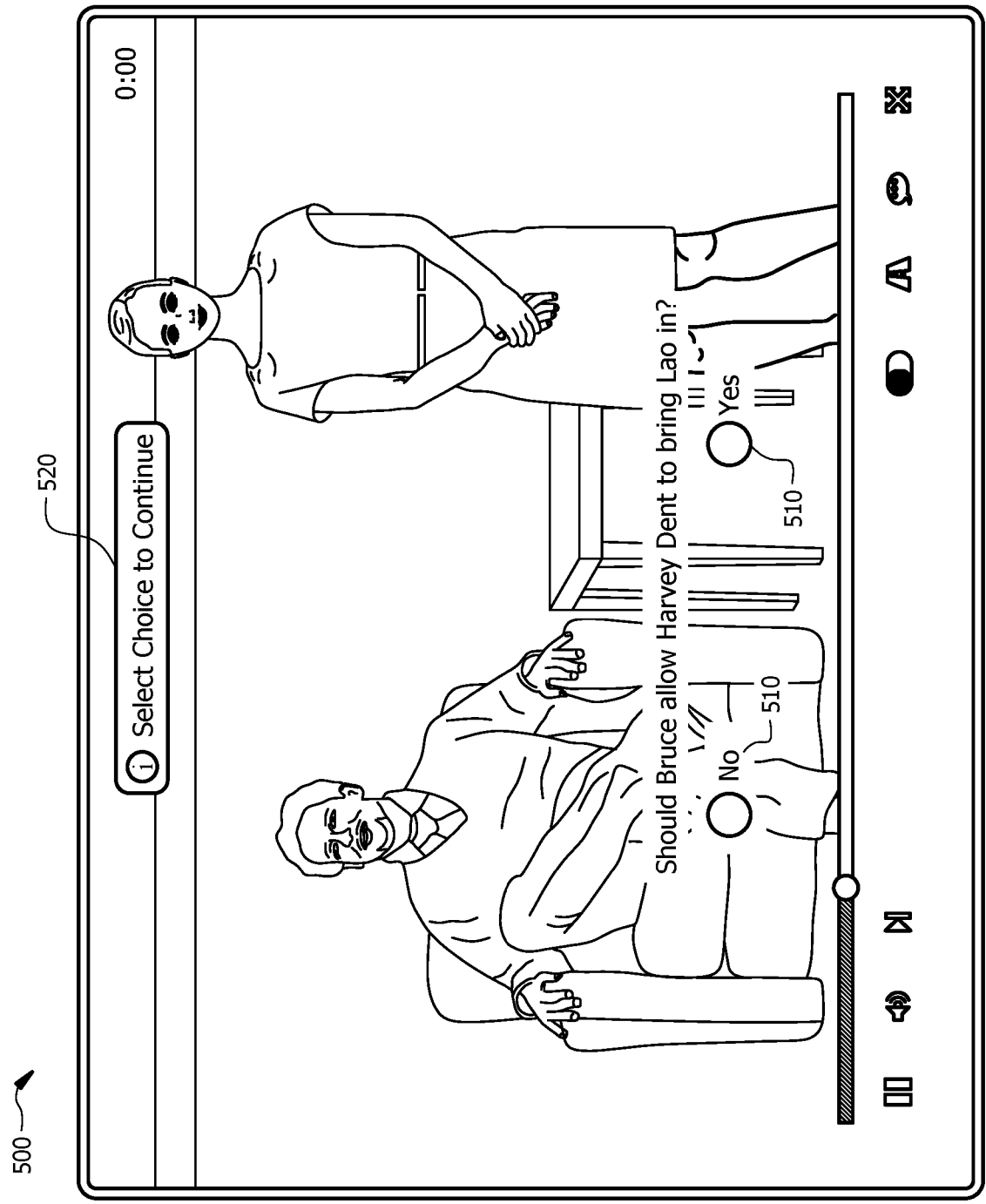
FIG. 5 illustrates an exemplary embodiment of a screenshot of a graphical user interface, in accordance with the disclosed principles, for a branching-plot movie.

FIG. 5 illustrates an exemplary embodiment of a screenshot 500 of a graphical user interface, in accordance with the disclosed principles, for a branching-plot movie in which the video element of the current node has finished playing and the user has not selected a choice of the choice text 510. If a user has not selected a choice by the time that the video element of the current node has finished playing, then the last frame of the video element of the current node is kept on display on the graphical user interface. A notification 520 appears to prompt the user to select between the choices of the choice text 510.

In the exemplary embodiment, the visual representation of the playlist 530 removes the visual representation of the node branches 430. In other embodiments, the visual representation of the node branches 430 stays on the playlist 440.

Figure 6A:
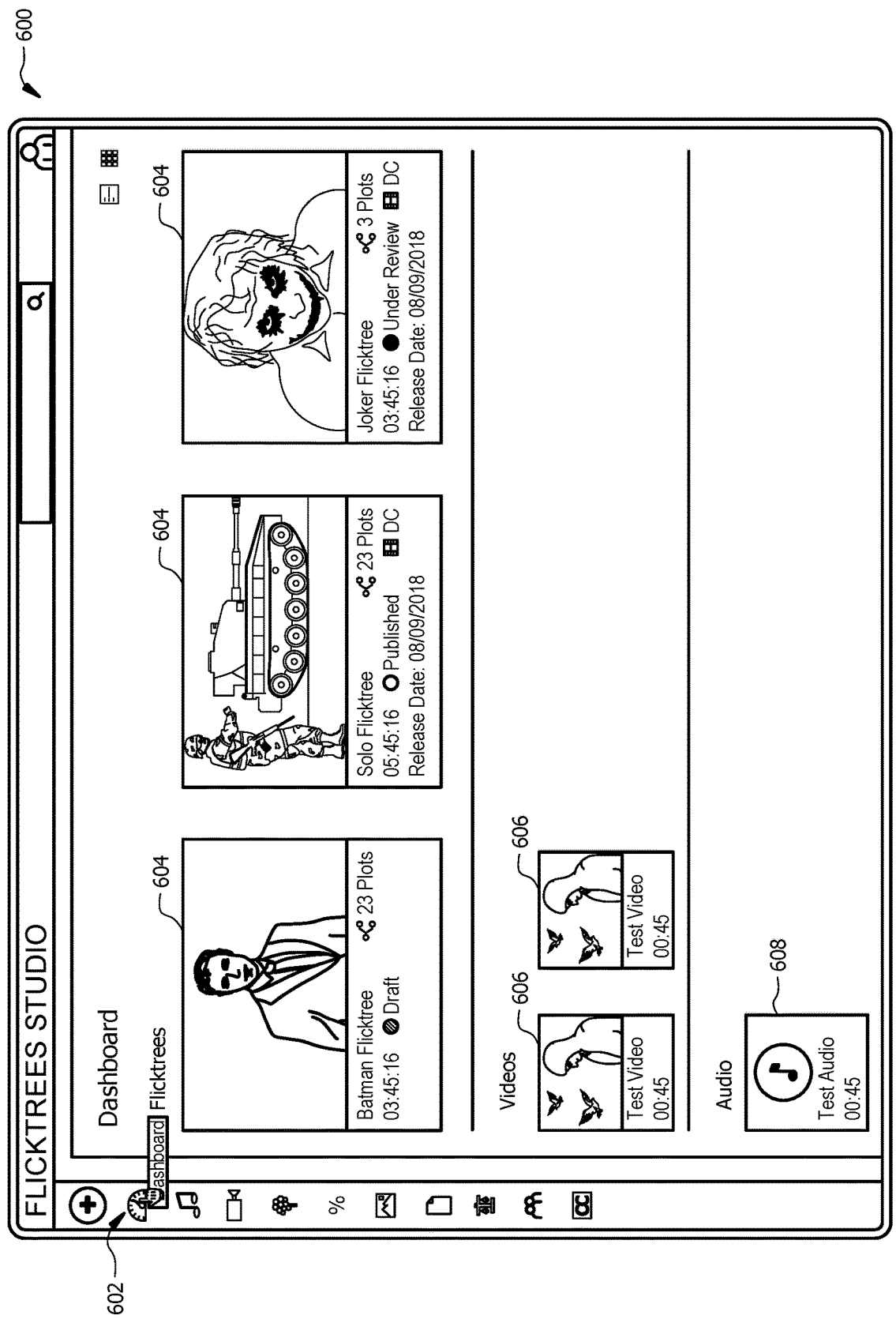
FIG. 6A is a screenshot of an exemplary embodiment of a graphical user interface, in accordance with the disclosed principles, for a studio for creating a branching-plot movie.

FIG. 6A is a screenshot 600 of an exemplary embodiment of a graphical user interface, in accordance with the disclosed principles, for a studio for creating a branching-plot movie. The studio's graphical user interface comprises a menu 602 for access to a dashboard, a library of video elements and audio elements, a video editor, a plot editor, and metrics of any movie stored in the system. FIG. 6A illustrates the dashboard aspect of the branching-plot movie studio and illustrates thumbnails of various branching-plot movies 604, video clips 606, and audio clips 608. In exemplary embodiment of FIG. 6A, the thumbnails of the branching-plot movies 604 show the status and state of the movies 604. For example, the movies 604 could be in draft form, published for views by users, or under review by an administrator of the system. The thumbnails of the movies 604 can also show other metrics related to the movie 604, such as release date of the movies 604, the number of plots/endings of the movies 604, etc. Similarly, the thumbnails of the video clips 606 and audio clips 608 may provide metric information, such as the duration of the video clips 606 and audio clips 608.

Figure 6B:
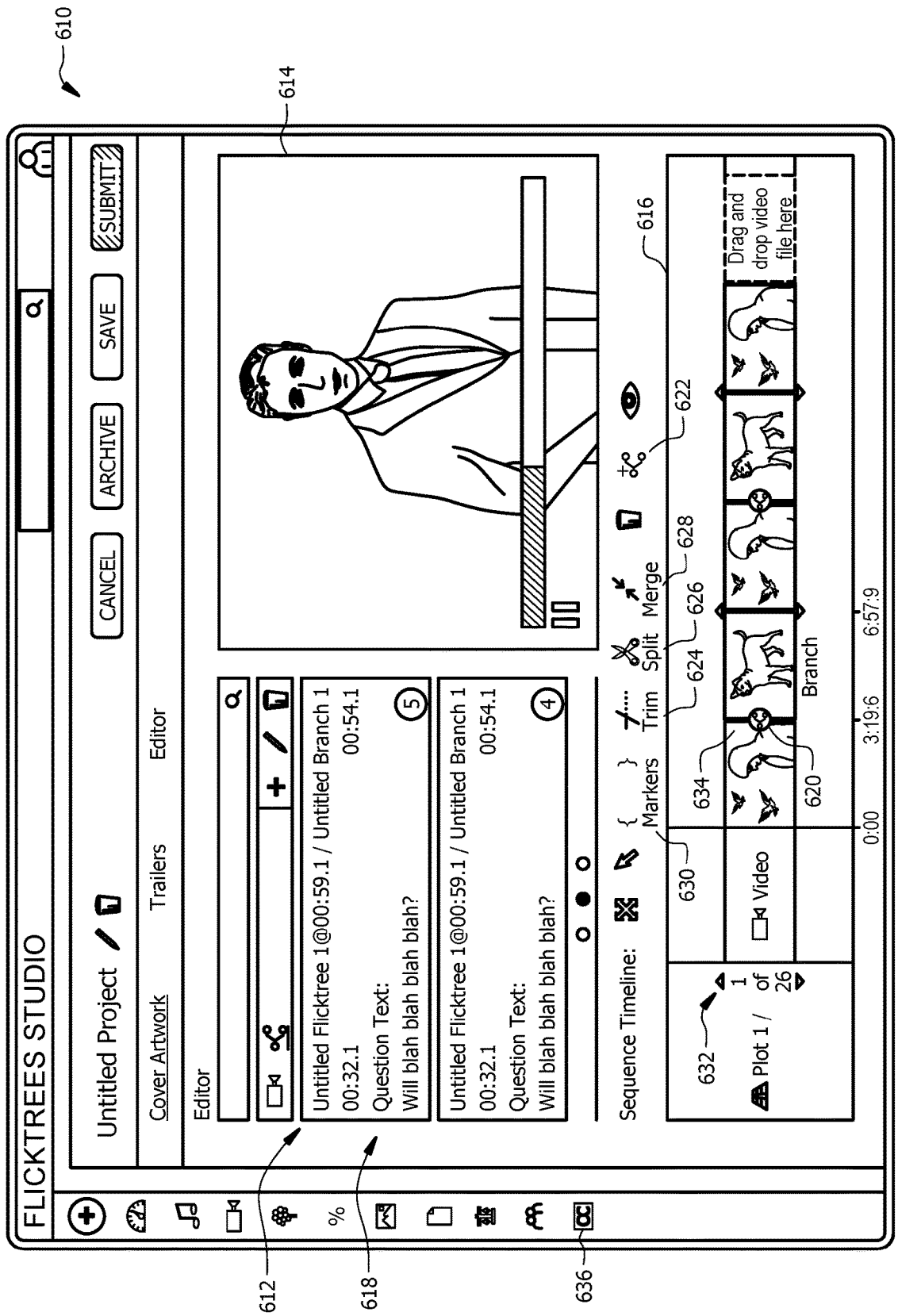
FIG. 6B illustrates an exemplary embodiment of a screenshot of a graphical user interface, in accordance with the disclosed principles, for a studio for creating a branching-plot movie.

FIG. 6B illustrates an exemplary embodiment of a screenshot 610 of a graphical user interface, in accordance with the disclosed principles, for a studio for creating a branching-plot movie. In the exemplary embodiment, the studio permits the user to see a list 612 of the branches with corresponding question text of the branching-plot movie. In one embodiment, the studio permits movie creators to see a video library alongside a preview 614 of the video element and audio element of a node. The preview 614 in another embodiment can display all video elements and audio elements of nodes in a playlist. The studio graphical user interface also includes a sequence editor 616 for the arrangement of plots and paths.

In the exemplary embodiment, the studio branch list 612 includes entries of the branches of branching-plot movie. Each entry 618 can include the corresponding question text of the branch. Metrics regarding the branch can also be included in the entry 618. Branch creation with question text and choice text is discussed further herein.

In one embodiment, the video library can show video thumbnails. The video thumbnails represent video elements of nodes. In one embodiment, the nodes comprise both video elements and audio elements linked together, so that when the video element of a node is put into the sequence editor, the corresponding audio element is also put into the audio playlist of the sequence editor. In other embodiments, the library comprises icons representing audio elements separate from the video thumbnails representing video elements, which indicates that the audio elements are separate files from the video elements, and the audio elements and video elements are linked together when a node is created in the sequence editor 616.

The graphical user interface also includes a sequence editor 616 showing a visual representation of a playlist. In the exemplary embodiment, the sequence editor 616 allows for the arrangement of a video playlist. In other embodiments, the sequence editor 616 allows for the arrangement of multiple video playlists and multiple audio playlists. The sequence editor 616 allows for the arrangement of any number of video playlists and audio playlists that the movie creator can use. The sequence editor 616 is arranged horizontally so that the arrangement of video elements and audio elements goes from left to right where the left side is chronologically earlier than the right side. Accordingly, the sequence editor regularly indicates the timeframe for the playlists.

In the exemplary embodiment, a movie creator drags and drops a video element (via the corresponding video thumbnail from a video library) into the sequence editor 616, into a video playlist. Similarly, the movie creator can drag and drop an audio element (via the corresponding audio icon (not illustrated)) into an audio playlist if available. In exemplary embodiment, the sequence editor comprises of a single playlist instead of a separate video playlist and a separate audio playlist. The movie creator can continue arranging any number of video elements and audio elements in the sequence editor 616 until he decides a branch 620 is warranted. The graphical user interface includes a branch icon 622 for adding a branch 620 into the playlist. In one embodiment, when the branch icon is selected, a dialog box appears for the movie creator to add the question text and the choice text for the branch. In another embodiment, when the branch icon 620 is selected, the movie creator is taken to another part of the studio to provide the question text and choice text for the branch, which is further discussed with regard to FIG. 6D. The number of choices created via the choice text determines the number of paths to be visually displayed in the sequence editor 616.

In the exemplary embodiment, the sequence editor 616 comprises tools for editing video content, especially the video elements and video clips inserted into the sequence editor. These tools allow for a movie creator to trim 624, split 626, and merge 628 video content using markers. Further discussion regarding these tools 624, 626, 628, and 630 of the sequence editor is below.

Once a branch 620 is added into the sequence editor 616, the movie creator can flip through the paths using the path indicator 632. When flipping through the paths in the sequence editor 616, video thumbnails 634 representing video elements can disappear from the playlist because some thumbnails 634 may not appear in certain paths, and accordingly video thumbnails 634 can appear in the playlist depending on the path being edited in the sequence editor 616. Again, the movie creator can add any number of video elements and audio elements into the playlist for a path before adding another branch, and when the movie creator changes paths for editing, all the video thumbnails and audio icons between the branches 620 are replaced by the video thumbnails and audio icons of the other path.

Once the movie creator decides that the branching-plot movie is complete, the branching-plot is finalized. During this process, the system 100 determines where the branches 620 are located in the playlist and creates nodes for audio elements and video elements between the branches 620. This process also creates the adjacency lists of each node of the branching-plot movie, and creates the relational table of the movie. In some embodiments, the video elements and audio elements already correspond to nodes and the finalization process creates the adjacency lists of the nodes and the relational table of the branching-plot movie.

The studio graphical user interface can include tools for including closed captions or subtitles 636 into the movie, and for manually saving a branching-plot movie. In some embodiments, the system 100 comprises an automatic save function in order to avoid the problem of "forgetting to save."

Figure 6C:
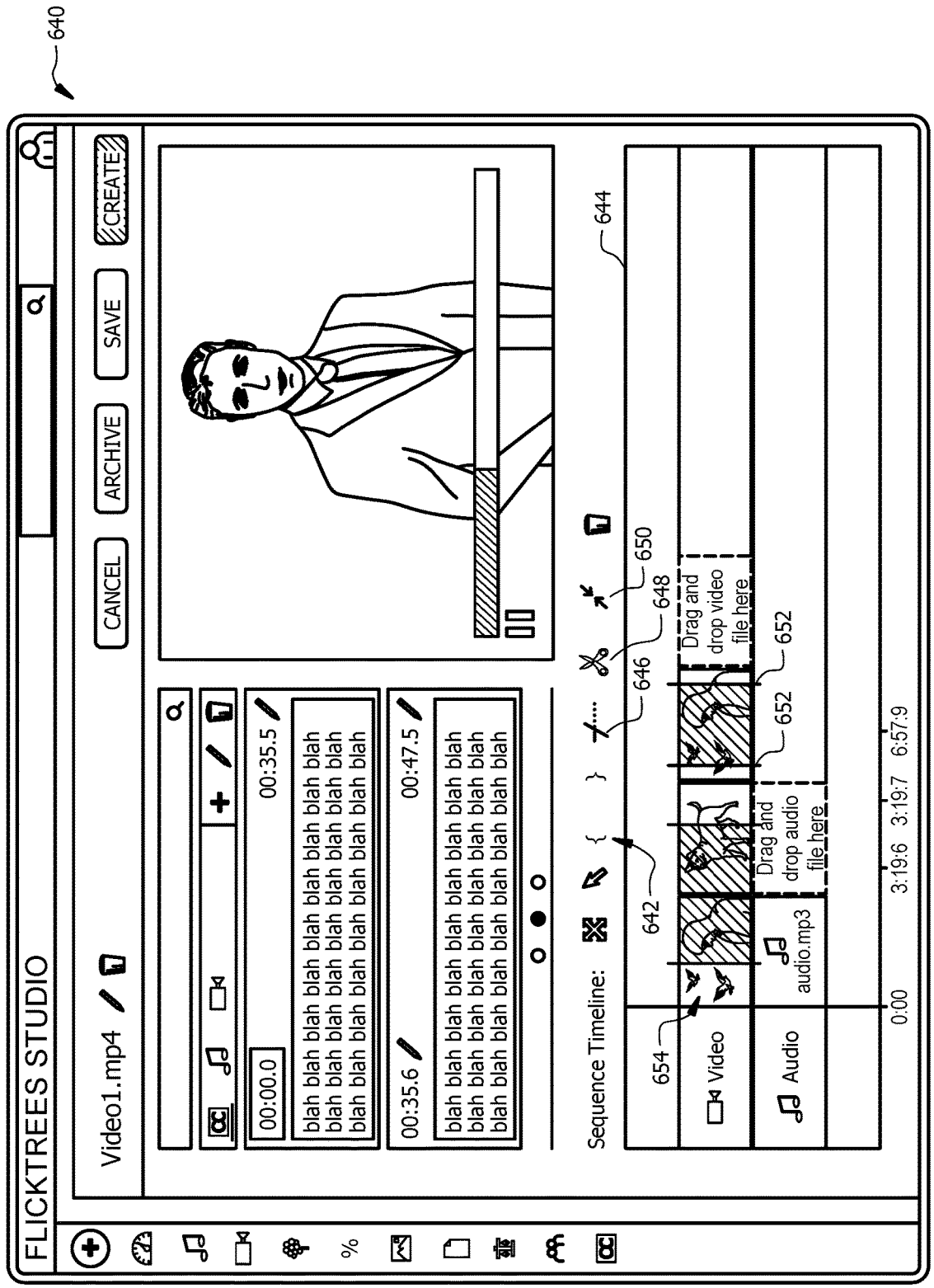
FIG. 6C is a screenshot of an exemplary embodiment of a graphical user interface, in accordance with the disclosed principles, for a studio for creating a branching-plot movie.

FIG. 6C is a screenshot 640 of an exemplary embodiment of a graphical user interface, in accordance with the disclosed principles, for a studio for creating a branching-plot movie. In the exemplary embodiment of FIG. 6C, the movie creator can edit the contents of video clips or video elements and can create new video clips or video elements for the branching-plot movie. In the exemplary embodiment, the users can select the markers 642 icon of the sequence editor 644 to select video content to trim 646, split 648, and merge 650. In the exemplary embodiment shown in FIG. 6C, the movie creator can use the markers to portion what video content to trim 646, split 648, and merge 650. As shown in FIG. 6C, the sequence editor 644 allows the movie creator to put markers 652 in the playlist 654, and any number of markers can be added to the playlist 654. The trim function 646 allows the movie creator to shave off any unwanted video content off a video clip or video element, leaving the wanted video content indicated by the markers 652. The split function 648 separates at least one video content portion from a video clip or video element and creates a new video clip or video element from the separated video content, the portion indicated by the markers 652. The merge function 650 allows the movie creator to concatenate portions from multiple video clips or video elements into a single video clip or video element, the portions indicated by the markers 652.

Figure 6D:
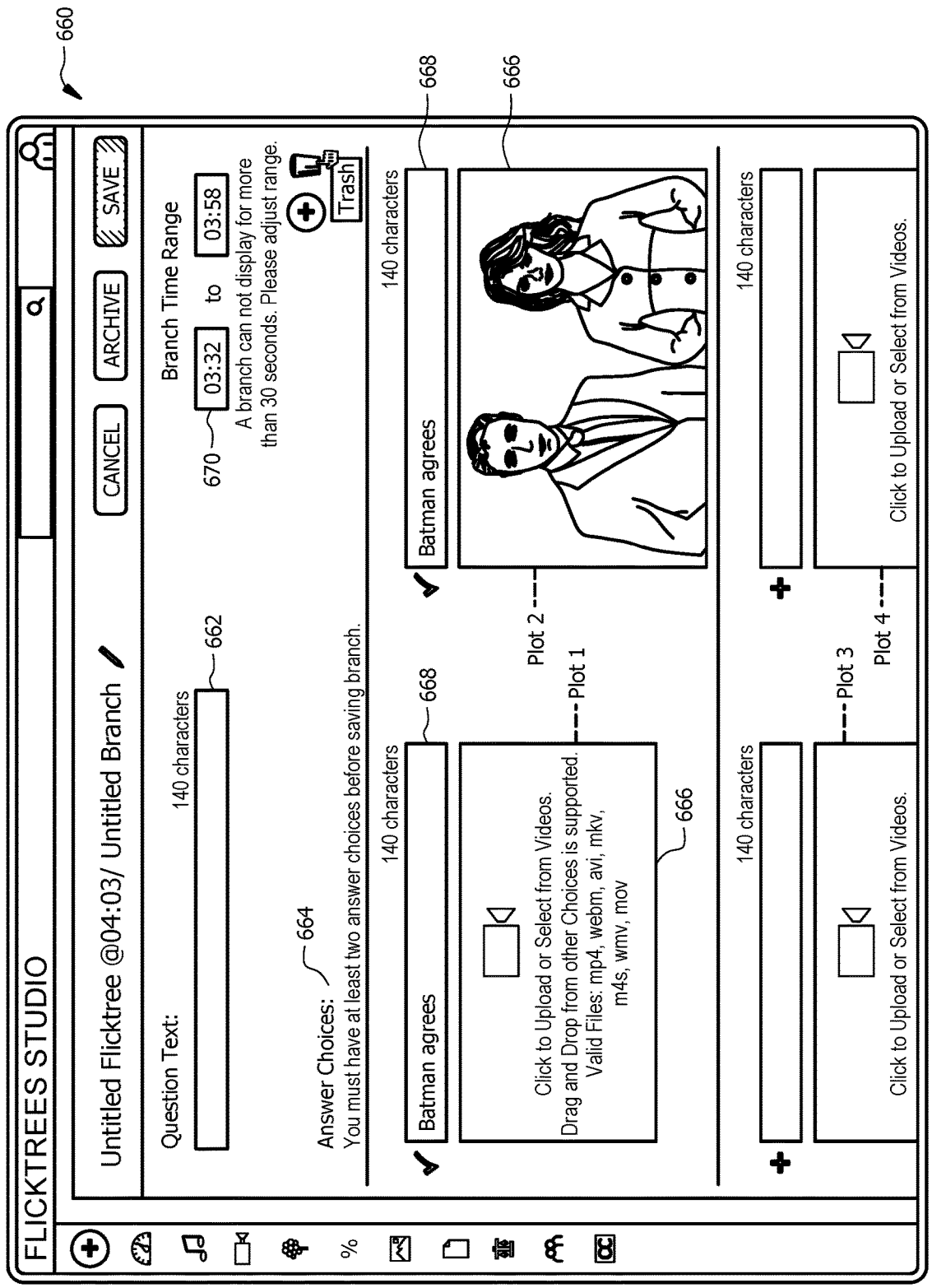
FIG. 6D is a screenshot of an exemplary embodiment of a graphical user interface, in accordance with the disclosed principles, for a studio for creating a branching-plot movie.

FIG. 6D is a screenshot 660 of an exemplary embodiment of a graphical user interface, in accordance with the disclosed principles, for a studio for creating a branching-plot movie. FIG. 6D illustrates the studio's graphical user interface after the movie creator selected the branch icon of FIG. 6B in an exemplary embodiment. In the exemplary embodiment, when the movie creator selects the branch icon of FIG. 6B, the movie creator is then provided the opportunity to provide question text 662 and answer choices 664. Each answer choice 664 comprises choice text, and the next video 666. Each answer choice 664 creates a new branch and accordingly a new plot of the branching-plot movie. As illustrated, the movie creator can also provide a time duration 670 for display of the question text and choice text 668 to the user. The movie creator can create as many answer choices 664 as desired.

Figure 7:
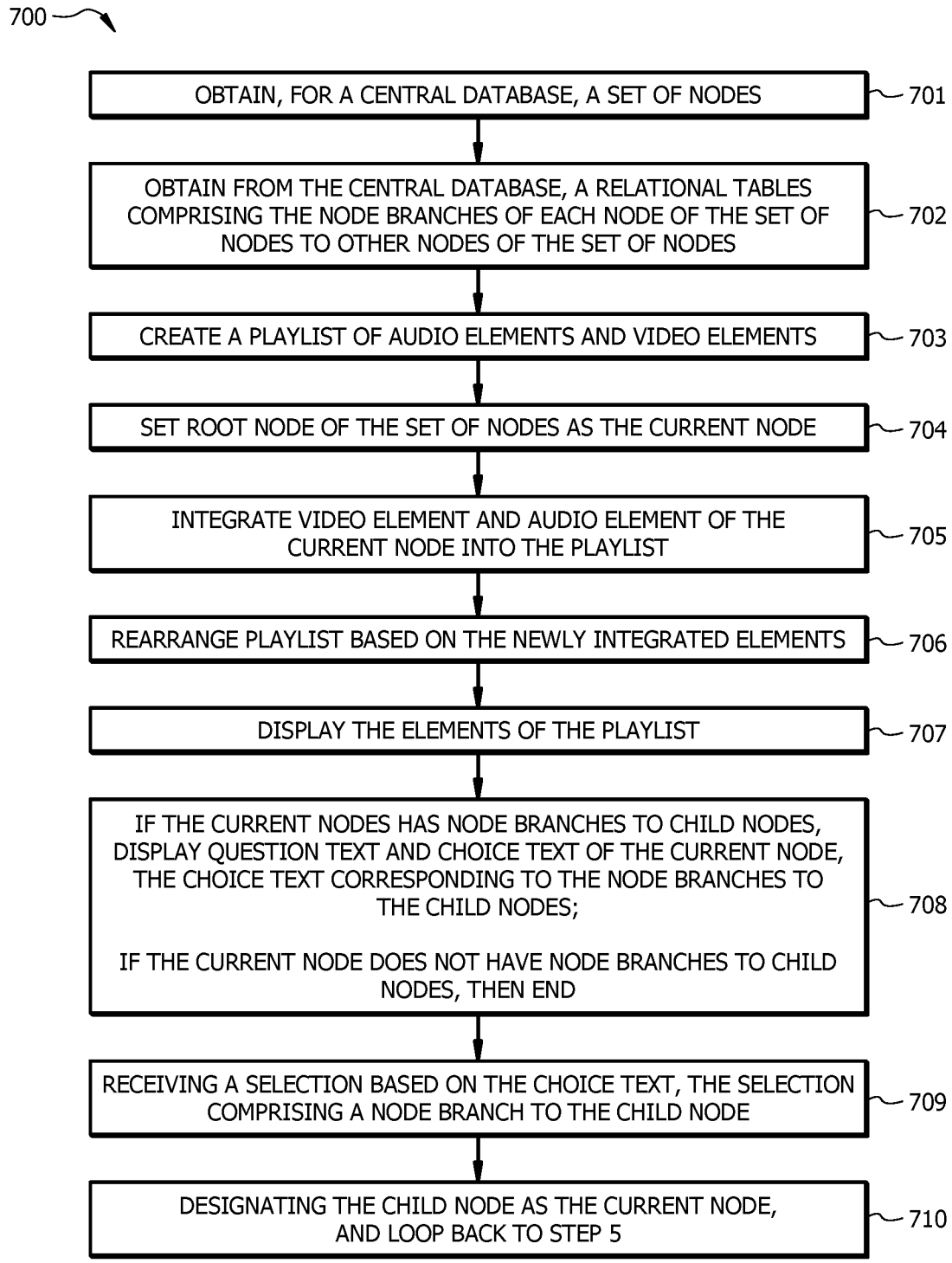
FIG. 7 is a flowchart of an exemplary embodiment of the branching-plot movie technique, specifically for displaying a branching-plot movie.

FIG. 7 is a flowchart of an exemplary embodiment of the branching-plot movie technique, specifically for displaying a branching-plot movie. First, a set of nodes is obtained from a central database (step 701). A relational table is also obtained from the central database, the relational table comprising the node branches of each node of the set of nodes to other nodes of the set of nodes (step 702). A playlist of audio elements and video elements is created (step 703). A root node of the set of nodes is set or designated as the current node (step 704). The video element and audio element of the current node are then integrated into the playlist (step 705). The playlist is rearranged to accommodate the newly integrated elements (step 706) and the elements of the playlist are displayed to the user (step 707). If the current node has node branches to child nodes, then the question text and choice text of the current node are displayed (step 708). A selection based on the choice text is received, and the selected comprises a node branch to a child node of the current node (step 709). The child node is set or designated as the current node, and the method loops back to step 705 (step 710). If the current nodes does not have node branches to child nodes, then the processing and display of the branching-plot movie is complete. (step 708).

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to (a) information permanently stored on non-writeable storage media (e.g., read only memory devices within a computer such as ROMs or CD-ROM disks readable only by a computer I/O attachment); (b) information alterably stored on writeable storage media (e.g., floppy disks and hard drives); or (c) information conveyed to a computer through communication media, such as a local area network, a telephone network, a public network like the Internet. It should be understood, therefore, that such media, when carrying computer readable instructions that direct the method functions of the present invention, represent alternate embodiments of the present invention.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than recited unless the particular claim expressly states otherwise.

Additional Description

The following paragraphs are offered as further description of the various embodiments disclosed invention.

In the first embodiment, the novel aspects of the present disclosure describe a computer-implemented method for creating branching-plot video content: obtaining, from a central database, a set of nodes, wherein each node of the set of nodes comprises an audio element, a video element, and a set of node branches, wherein at least one node of the set of nodes comprises a parent node identifier and at least one child node identifier; obtaining, from the central database, a relational table comprising the node branches of each node of the set of nodes to other nodes of the set of nodes based on each node's parent node identifier and at least one child node identifier; designating a node of the set of nodes as the current node; creating a playlist of audio segments and video segments for display to a user; traversing the set of nodes by: integrating the video element and audio element of the current node into the playlist; rearranging the playlist based on the newly integrated video element and audio element; displaying the video segment and the audio segment of the playlist; receiving a selection from the user, wherein the selection corresponds to a relationship of the current node on the relational table to a child node of the current node; and based on the selection, designating the child node as the current node.

In another aspect of the first embodiment, novel aspects of the present disclosure describe a computer-implemented method for creating branching-plot video content: obtaining, from a central database, a set of nodes, wherein each node of the set of nodes comprises an audio element, a video element, and a set of node branches, wherein at least one node of the set of nodes comprises a parent node identifier and at least one child node identifier; obtaining, from the central database, a relational table comprising the node branches of each node of the set of nodes to other nodes of the set of nodes based on each node's parent node identifier and at least one child node identifier; designating a node of the set of nodes as the current node; creating a playlist of audio segments and video segments for display to a user; traversing the set of nodes by: integrating the video element and audio element of the current node into the playlist; rearranging the playlist based on the newly integrated video element and audio element; displaying the video segment and the audio segment of the playlist; receiving a selection from the user, wherein the selection corresponds to a relationship of the current node on the relational table to a child node of the current node; based on the selection, designating the child node as the current node; and one or more limitations selected from the following list:

wherein a second subset of the set of nodes is preselected for traversal;

wherein a second subset of the set of nodes are end nodes;

wherein backtracking through the set of nodes is based on a second node branch different from the selection;

wherein one of the nodes of the set of nodes is a root node;

wherein a non-relational database for storage and retrieval of metrics data;

wherein displaying the plurality of node branches to the user for the selection;

wherein one or more node branches are restricted from being selected by the user;

wherein satisfying a condition upon which the one or more node branches that were restricted from being selected by the user are no longer restricted and are available for selection by the user;

wherein completing at least one traversal of the set of nodes by the user satisfies the condition.

In a second embodiment, novel aspects of the present disclosure describe a system for displaying a branching-plot movie to a remote computer, the system comprises: a computer store containing data, for the branching-plot movie, comprising audio and video elements; wherein the branching-plot movie comprises a set of nodes, wherein each node comprises a video element and an audio element, wherein relationships of each node of the set of nodes is provided in a relational table; a computer server coupled to the computer store through a computer network and programmed to: obtain, from the computer store, the set of nodes of the branching-plot movie; generating an audio and video sequence comprises at least one video element and at least one audio element; provide a viewer application to the remote computer, wherein the view application displays a graphical representation of the audio video sequence; traversing the set of nodes by: displaying at least one video element and at least one audio element of the audio and video sequence on the view application of the remote computer; receiving a selection from the user through the view application, wherein the selection comprises a relationship of the relational table; based on the election, retrieving, from the computer store, and adding, to the audio and video sequence, a second video segment and a second audio segment of the selected node; and automatically rearranging the audio elements and video elements of the audio and video sequence based on the selection from the user.

In another aspect of the second embodiment, novel aspects of the present disclosure describe a system for displaying a branching-plot movie to a remote computer, the system comprises: a computer store containing data, for the branching-plot movie, comprising audio and video elements; wherein the branching-plot movie comprises a set of nodes, wherein each node comprises a video element and an audio element, wherein relationships of each node of the set of nodes is provided in a relational table; a computer server coupled to the computer store through a computer network and programmed to: obtain, from the computer store, the set of nodes of the branching-plot movie; generating an audio and video sequence comprises at least one video element and at least one audio element; provide a viewer application to the remote computer, wherein the view application displays a graphical representation of the audio video sequence; traversing the set of nodes by: displaying the at least one video element and the at least one audio element of the audio and video sequence on the view application of the remote computer; receiving a selection from the user through the view application, wherein the selection comprises a relationship of the relational table; based on the election, retrieving, from the computer store, and adding, to the audio and video sequence, a second video segment and a second audio segment of the selected node; automatically rearranging the audio elements and the video elements of the audio and video sequence based on the selection from the user; and one or more limitations selected from the following list:

wherein a second subset of the set of nodes is preselected for traversal;

wherein a second subset of the set of nodes are end nodes;

wherein backtracking through the set of nodes based on a second node branch different from the selection;

wherein one of the nodes of the set of nodes is a root node;

wherein a non-relational database for storage and retrieval of metrics data;

wherein the traversal of the set of notes further comprises: displaying the plurality of node branches to the user for the selection;

wherein the traversal of the set of notes further comprises: one or more node branches that are restricted from being selected by the user;

wherein the traversal of the set of nodes further comprises: a condition upon which the one or more node branches that are restricted from being selected by the user are no longer restricted and are available for selection by the user; and wherein the condition is satisfied when the user completes at least one traversal through the set of nodes.

What is claimed is:

1. A computer-implemented method for creating branching-plot video content comprising:
   (a) obtaining, from a central database, a set of nodes, wherein each node of the set of nodes comprises an audio element, a video element, a unique identifier, and a set of node branches, wherein at least one node of the set of nodes comprises a parent node identifier and at least one child node identifier;
   (b) obtaining, from the central database, a relational table comprising the node branches of each node of the set of nodes to other nodes of the set of nodes based on each node's parent node identifier and the at least one child node identifier, wherein the relational table is a closure table, wherein each of the node branches has an ancestor element, descendant element, and a lengths element, wherein the lengths element stores the depth of each descendant;

(c) designating a node of the set of nodes as the current node;

(d) creating a playlist of audio segments and video segments for display to a user;

(e) traversing the set of nodes by:
  i. integrating the video element and audio element of the current node into the playlist;
  ii. rearranging the playlist based on the newly integrated video element and audio element;
  iii. displaying the video segment and the audio segment of the playlist;
  iv. receiving a selection from the user, wherein the selection corresponds to a relationship of the current node on the relational table to a child node of the current node;
  v. based on the selection,
designating the child node as the current node;

(f) providing a navigation tool to backtrack to an earlier node prior to the completion of the current node.

2. The method of claim 1, wherein a second subset of the set of nodes is preselected for traversal.

3. The method of claim 1, wherein a second subset of the set of nodes are end nodes.

4. The method of claim 1, further comprising: backtracking through the set of nodes based on a second node branch different from the selection.

5. The method of claim 1, wherein one of the nodes of the set of nodes is a root node.

6. The method of claim 1, wherein the traversing of the set of nodes further comprises:
  one or more node branches that are restricted from being selected by the user.

7. The method of claim 6, wherein the traversing of the set of nodes further comprises:
  satisfying a condition upon which the one or more node branches that were restricted from being selected by the user are no longer restricted and are available for selection by the user.

8. The method of claim 7, wherein completing at least one traversal of the set of nodes by the user satisfies the condition.

9. The method of claim 1, wherein the traversing the set of nodes further comprises:
  utilizing an adjacency list concurrently with the closure table.

10. The method of claim 9, wherein the traversing the set of nodes further comprises:
  utilizing incidence matrices concurrently with the adjacency list and the closure table.

11. A system for displaying a branching-plot movie to a remote computer, the system comprising:
  a computer store containing data, for the branching-plot movie, comprising audio and video elements;
    (1) wherein the branching-plot movie comprises a set of nodes;
    (2) wherein each node comprises a video element, a unique identifier, and an audio element,
    (3) wherein relationships of each node of the set of nodes is provided in a relational table, wherein the relational table is a closure table comprising node branches of each node of the set of nodes to other nodes of the set of nodes based on each node's parent node identifier and the at least one child node identifier, wherein each of the node branches has an ancestor element, descendant element, and a lengths element, wherein the lengths element stores the depth of each descendent;
  a computer server coupled to the computer store through a computer network and programed to:
    (1) obtain, from the computer store, the set of nodes of the branching-plot movie;
    (2) generate an audio video sequence of audio elements and video elements, wherein the audio and video sequence comprise at least one video element and at least one audio element;
    (3) provide a viewer application to the remote computer, wherein the viewer application displays a graphical representation of the audio and video sequence;
    (4) traversing the set of nodes by:
      (a) displaying the at least one video element and the at least one audio element of the audio and video sequence on the viewer application of the remote computer;
      (b) receiving a selection from the user through the viewer application, wherein the selection comprises a relationship of the relational table;
      (c) based on the selection, retrieving, from the computer store, and adding, to the audio and video sequence, a second video segment and a second audio segment of the selected node;
      (d) automatically rearranging the audio elements and the video elements of the audio and video sequence based on the selection from the user;
      (e) providing a navigation tool to backtrack to an earlier node prior to the completion of a current node.

12. The system of claim 11, wherein a second subset of the set of nodes is preselected for traversal.

13. The system of claim 11, wherein a second subset of the set of nodes are end nodes.

14. The system of claim 11, further comprising: backtracking through the set of nodes based on a second node branch different from the selection.

15. The system of claim 11, wherein one of the nodes of the set of nodes is a root node.

16. The system of claim 11, wherein the traversing of the set of nodes further comprises:
  one or more node branches that are restricted from being selected by the user.

17. The system of claim 16, wherein the traversing of the set of nodes further comprises:
  a condition upon which the one or more node branches that are restricted from being selected by the user are no longer restricted and are available for selection by the user.

18. The system of claim 17, wherein the condition is satisfied when the user completes at least one traversal through the set of nodes.

19. The system of claim 11, wherein the traversing of the set of nodes further comprises:
  an adjacency list, wherein the adjacency list is used concurrently with the closure table.

20. The system of claim 19, wherein the traversing of the set of nodes further comprises:

incidence matrices, wherein the incidence matrices are used concurrently with the adjacency list and the closure table.

* * * * *